Aug. 17, 1954     A. B. TAYLOR     2,686,492
SIGNAL AND MARKER DEVICE FOR AUTOMOTIVE VEHICLES
Filed April 3, 1953     2 Sheets-Sheet 1
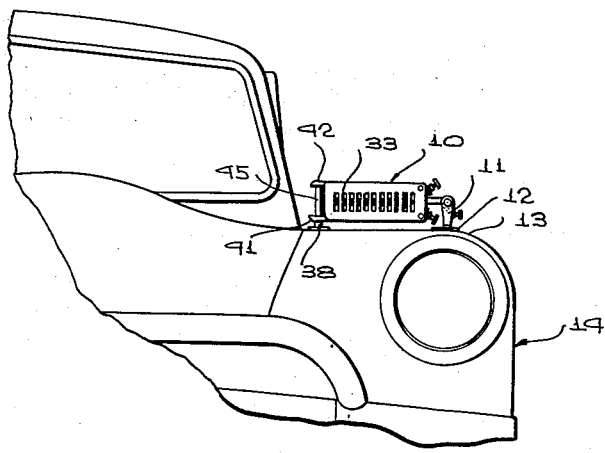
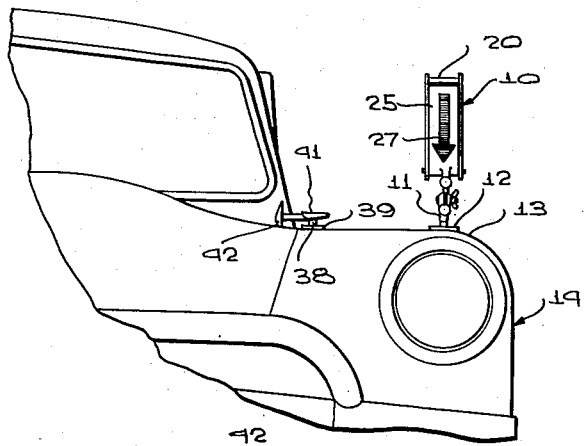
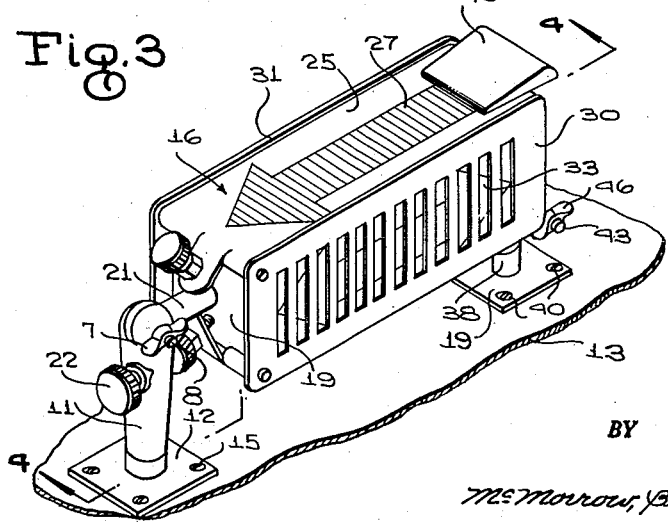
INVENTOR.
ADA B. TAYLOR Aug. 17, 1954        A. B. TAYLOR        2,686,492
SIGNAL AND MARKER DEVICE FOR AUTOMOTIVE VEHICLES
Filed April 3, 1953                                   2 Sheets-Sheet 2
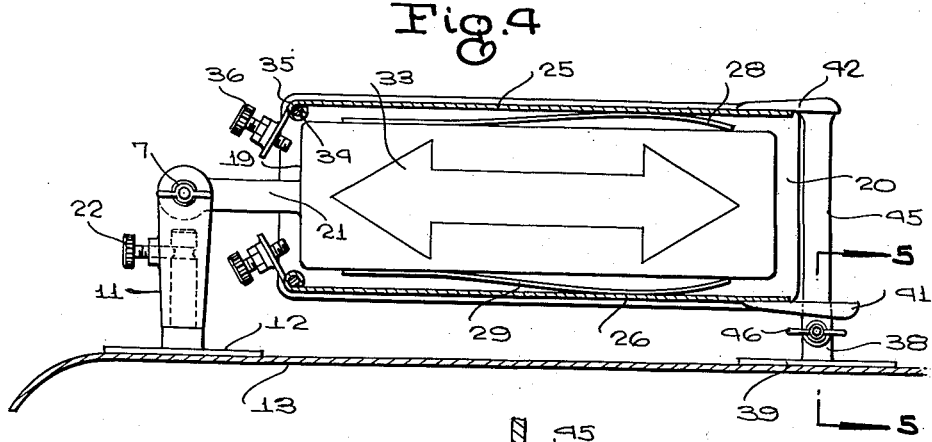
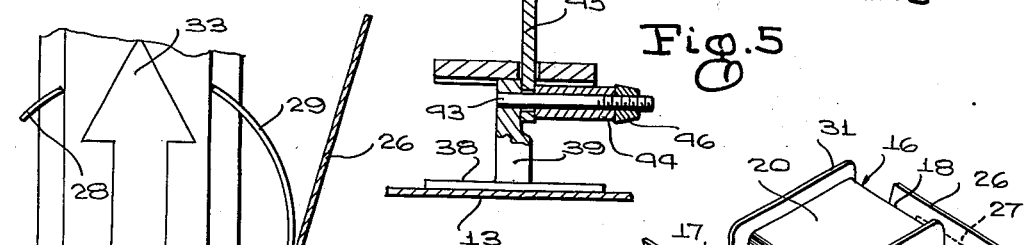
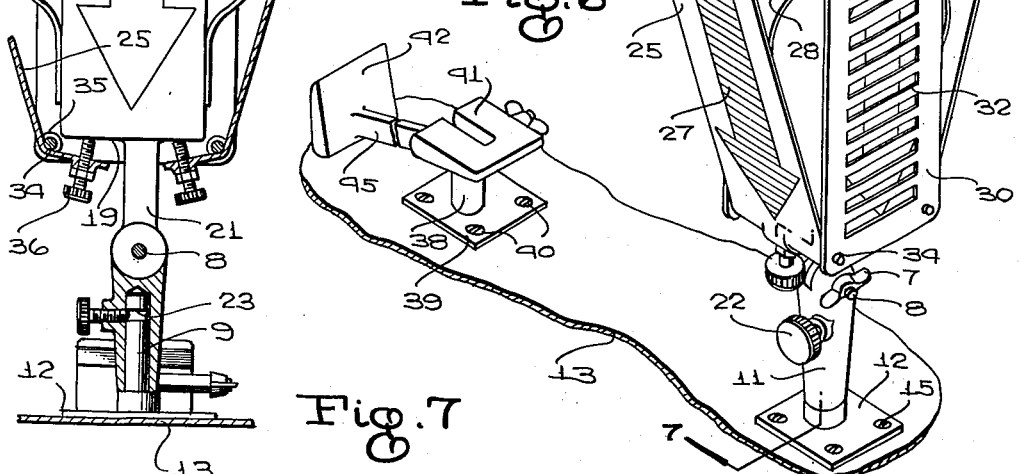
INVENTOR.
ADA B. TAYLOR Patented Aug. 17, 1954

2,686,492

UNITED STATES PATENT OFFICE 2,686,492

SIGNAL AND MARKER DEVICE FOR AUTOMOTIVE VEHICLES

Ada B. Taylor, Rimbey, Alberta, Canada

Application April 3, 1953, Serial No. 346,606

Claims priority, application Canada August 20, 1952

3 Claims. (Cl. 116—28)

1

This invention relates to a device for an automotive vehicle which is for use to mark or indicate the presence of the vehicle when standing still in the darkness.

Whenever an automotive vehicle is brought to a standstill upon a road after darkness has set in for appropriate repair or attention, such vehicle constitutes a grave hazard, particularly if its signal and lighting system has become inoperative. In such situations it is customary to employ flares. However, flares have the disadvantages in that they are inconvenient to store and offer a distinct fire hazard.

An object of the present invention is to provide a signal and marker device which eliminates the fire hazard of flares and which is readily placed in operation to serve as both a signal and marker for indicating the location of a stalled vehicle upon a road after darkness.

Another object of the present invention is to provide a signal and marker device which is simple in structure, easy to install, and highly efficient in action.

Other objects and advantages will become apparent from the following description taken in conjunction with the accompanying drawings wherein:

Figure 1 is a fragmentary front view of an automotive vehicle equipped with the signal and marker device of the present invention, the device being in the position for use to indicate direction signals when the vehicle is in motion.

Figure 2 is a fragmentary front view of the assembly of Figure 1, but showing the device in the position for use to mark the presence of the vehicle when standing still in darkness.

Figure 3 is an enlarged perspective view of the device of the present invention in the position of Figure 1.

Figure 4 is a sectional view taken on the line 4—4 of Figure 3.

Figure 5 is an enlarged fragmentary view taken on the line 5—5 of Figure 4.

Figure 6 is an enlarged perspective view of the device of the present invention in the position of Figure 2.

Figure 7 is a sectional view taken on the line 7—7 of Figure 6.

Referring to the drawings, the numeral 10 indicates the signal and marker device of the present invention, such device comprising a first standard 11 which has a lower end adapted to be attached to a support. As shown, the lower end is rotatably supported upon an upstanding pin 9 carried by a base 12, the base being attached to the fender 13 of an automobile 14 by means of bolts 15. A closed housing 16 having opposed side walls 17 and 18 and end walls 19 and 20 is horizontally disposed with respect to the standard 11 and has the end wall 19 connected to the upper end of the standard for movement from the horizontal position to a vertical position and for rotational movement about the standard 11 as an axis. Specifically, the end wall 19 has an arm 21 projecting therefrom, the arm having the free end pivotally connected to the upper end of the standard for swinging movement about a horizontal axis or bolt 8, the end of the bolt being threaded and being in threaded engagement with a wing nut 7. It is to be noted that the wing nut 7 releasably holds the housing 16 in either its horizontal or vertical position. The housing 16 is retained in a select position of its rotational movement by means of a set screw 22 extending transversely through the standard 11 adjacent its upper end and having the inner end engaging a peripheral groove 23 formed in the pin 9.

A pair of plates 25 and 26 are arranged exteriorly of and in horizontal face to face positions with respect to the opposed side walls 17 and 18 respectively, and have the one end adjacent the standard 11 connected to the end wall 19 of the housing 16 for movement from the horizontal positions with respect to the side walls 17 and 18 to positions at an angle with respect to said side walls 17 and 18. The exterior face of each of the plates 25 and 26 is provided with an attention attracting indication 27, in this instance, an arrow. As shown, the plates 25 and 26 are each spring biased, the plate 25 carrying an arcuate leaf spring 28 on its inner face and bearing against the side wall 17 and the plate 26 also carrying an arcuate leaf spring 29 on its inner face and bearing against the side wall 18. Interposed between the plates 25 and 26 and fixed to the adjacent side walls of the housing 16 are plates 30 and 31. The plate 30 is provided with a grille 32 which covers the translucent direction indicator 33 on the adjacent side wall of the housing. Specifically, the plates 25 and 26 have the ends adjacent the standard 11 hingedly connected to the plates 30 and 31. Since this connection for each of the plates 25 and 26 is the same, that of only one will be specifically described. The plate 25 has the end adjacent the standard 11 hingedly connected to the plates 30 and 31 by means of a pin 34 supported in the latter plates and extending through a hinge barrel 35 carried by the plate 25. The angular position of the plate 25 relative to the side wall 17 may be adjusted by means of the set screw 36.

A second standard 38 is positioned adjacent the other of the end walls or the end wall 20 and has a lower end adapted to be attached to a support. As shown, the lower end of the standard 38 is fixed to a base 39, the base 39 being likewise attached to the fender 13 of the automobile 14 by means of bolts 40. On the upper end of the second standard 38 is a means which embracingly engages the other ends of the plates 25 and 26. Specifically, such means is releasable and embodies a shelf 41 fixed on the upper end of the standard 38 and a shelf 42 arranged in superimposed spaced relation with respect to the shelf 41 and connected to the second standard 38 for pivotal movement about an axis or pin 43 carried by the latter standard. The pin 43 has a sleeve 44 thereon which is movable into and out of engagement with the leg 45 carried by the shelf 42 by means of the wing nut 46 to releasably hold the shelf 42 in superimposed spaced relation with respect to the shelf 41. When the housing 16 is in the horizontal position the under face adjacent the other end of the plate 26 is engaged by the shelf 41 and the upper face adjacent the other end of the plate 25 is engaged by the shelf 42.

In use, with the vehicle in motion and the device of the present invention in the position of Figure 1, the signal system of the vehicle is actuated by the operator whenever a turn is desired, resulting in the illumination of the corresponding portion of the translucent indicator 33. When the vehicle is stopped along the road after darkness, with its signal and lighting system out of order, the operator turns the wing nut 46 in the proper direction to cause the sleeve 44 to be moved out of engagement with the leg 45, and then swings the shelf 42 out of engagement with the plate 25. Next, the operator releases the wing nut 7, swings the housing 16 to its vertical position, then rotates the housing 16 until the plates 25 and 26 face the front and back of the road respectively, and finally operates the set screw 22 to hold the housing 16 in its selected position of rotational movement. When in the latter position, the headlights of approaching vehicles from opposite directions will play upon the adjacent attention attraction arrow, thereby warning the operators of the location of the disabled vehicle.

What I claim:

1. In a signal and marker device for an automotive vehicle, a first standard having its lower end adapted to be attached to a support, a closed housing including opposed side walls and two end walls horizontally disposed with respect to said standard and having one of the end walls connected to the upper end of said standard for movement from the horizontal position to a vertical position and for rotational movement about said standard as an axis, a pair of plates arranged exteriorly of and in horizontal face to face positions with respect to the opposed side walls of said housing and having the one ends adjacent said standard connected to said one end wall of said housing for movement from the horizontal positions with respect to said side walls to positions at an angle with respect to said side walls, the exterior face of each of said plates being provided with an attention attracting indication, a second standard positioned adjacent the other of the end walls of said housing and having the lower end adapted to be attached to a support, and means on the upper end of said second standard and embracingly engaging the other ends of said plates.

2. In a signal and marker device for automotive vehicles, a first standard having its lower end adapted to be attached to a support, a closed housing including opposed side walls and two end walls horizontally disposed with respect to said standard and having one of the end walls connected to the upper end of said standard for movement from the horizontal position to a vertical position and for rotational movement about said standard as an axis, a pair of spring biased plates arranged exteriorly of and in horizontal face to face positions with respect to the opposed side walls of said housing and having the one ends adjacent said standard connected to said one end wall of said housing for movement from the horizontal positions with respect to said side walls to positions at an angle with respect to said side walls, the exterior face of each of said plates being provided with an attention attracting indication, a second standard positioned adjacent the other of the end walls of said housing and having the lower end adapted to be attached to a support, and releasable means on the upper end of said second standard and embracingly engaging the other ends of said plates.

3. In a signal and marker device for an automotive vehicle, a first standard having its lower end adapted to be attached to a support, a closed housing including opposed side walls and two end walls horizontally disposed with respect to said standard and having one of the end walls connected to the upper end of said standard for movement from the horizontal position to a vertical position and for rotational movement about said standard as an axis, a pair of spring biased plates arranged exteriorly of and in horizontal face to face positions with respect to the opposed side walls of said housing and having the one ends adjacent said standard connected to said one end wall of said housing for movement from the horizontal positions with respect to said side walls to positions at an angle with respect to said side walls, the exterior face of each of said plates being provided with an attention attracting indication, a second standard positioned adjacent the other of the end walls of said housing and having the lower end adapted to be attached to a support, releasable means on the upper end of said second standard and embracingly engaging the other ends of said plates, and releasable means on said first standard for holding said housing in a select position of its rotational movement.

References Cited in the file of this patent

UNITED STATES PATENTS

| Number | Name | Date |
|---|---|---|
| 1,175,271 | Kennedy | Mar. 14, 1916 |
| 1,678,197 | Pratt | July 24, 1928 |